Figure 1:
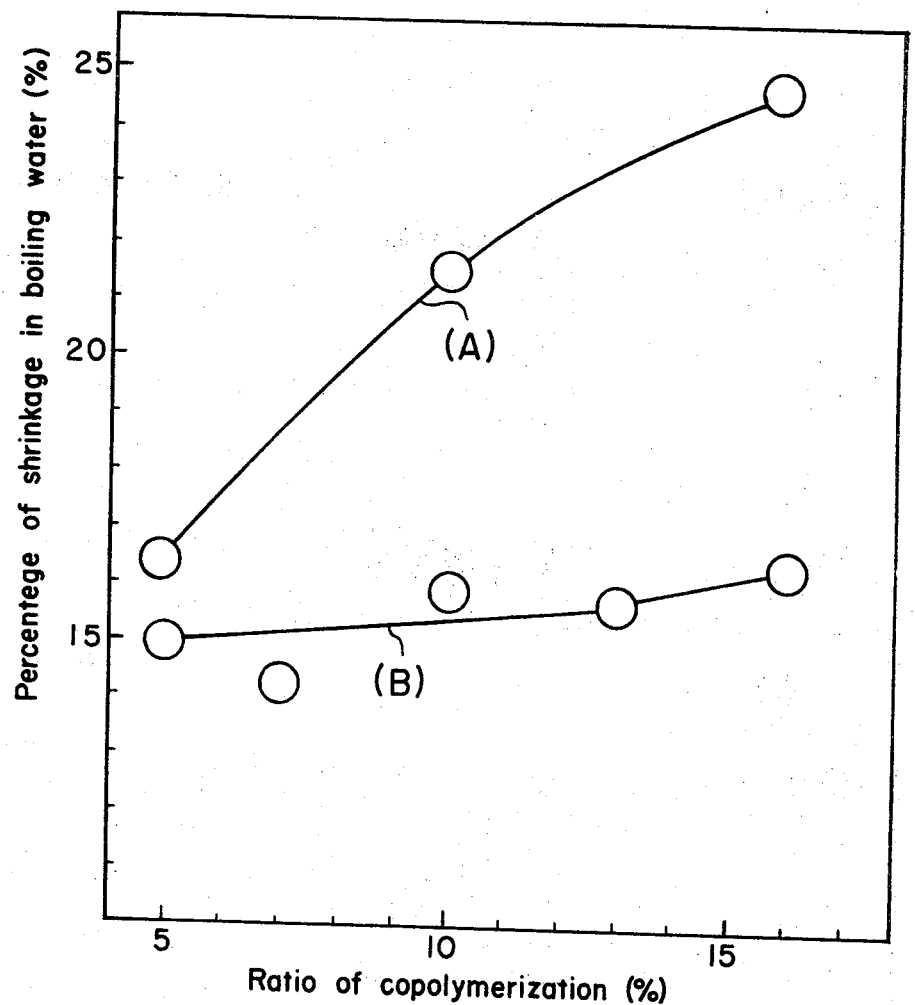

United States Patent [19]
Kanno et al.

[11] 3,769,149
[45] Oct. 30, 1973

[54] PROCESS FOR PRODUCING ACRYLIC COMPOSITE FILAMENTS AND SAID COMPOSITE FILAMENTS

[75] Inventors: Hiroshi Kanno, Amagasaki City; Kazuo Okamoto, Osaka, both of Japan

[73] Assignee: Kanegafuchi Boseki Kabushiki Kaisha, Tokyo, Japan

[22] Filed: May 28, 1971

[21] Appl. No.: 147,963

[30] Foreign Application Priority Data
June 3, 1970  Japan.................................. 45/48264

[52] U.S. Cl.................. 161/172, 161/173, 161/177, 264/168, 264/182, 260/79.7, 260/85.5 ES
[51] Int. Cl................................................ D01d 5/22
[58] Field of Search.................... 161/173, 172, 175, 161/176, 177; 264/168, 172, 182; 28/82

[56] References Cited
UNITED STATES PATENTS
3,515,627  6/1970  Sekiguchi........................ 161/177 X
3,624,195  11/1971  Nakayama........................... 161/173
3,644,609  2/1972  Nakagawa........................... 161/173

*Primary Examiner*—George F. Lesmes
*Assistant Examiner*—M. E. McCamish
*Attorney*—Woodhams, Blanchard and Flynn

[57]  ABSTRACT

Acrylic composite filaments having an improved crimpability, a large diameter of crimps, improved yarn properties, such as elongation elasticity, Young's modulus knot strength ratio, and an antipilling property are produced by bonding in a side-by-side relation, a usual acrylonitrile random copolymer with a copolymer obtained by previously polymerizing a monomer consisting essentially of acrylonitrile until the polymerization conversion of said monomer reaches 30 to 70 percent and then adding a particular acrylate comonomer to the resulting polymer and successively subjecting the mixture to the polymerization.

5 Claims, 2 Drawing Figures

PROCESS FOR PRODUCING ACRYLIC COMPOSITE FILAMENTS AND SAID COMPOSITE FILAMENTS

The present invention relates to the production of acrylic composite filaments having an improved crimpability and excellent physical properties and more particularly the production of acrylic composite filaments having a large diameter of crimps, improved yarn properties, such as elongation elasticity, Young's modulus knot strength ratio and the like and an antipilling property, wherein a usual acrylonitrile random copolymer is bonded eccentrically in a side-by-side relation with a copolymer obtained by previously polymerizing a monomer consisting essentially of acrylonitrile until the polymerization conversion of said monomer reaches 30 to 70 percent and then adding acrylate comonomer to the resulting polymer and successively subjecting the mixture to the polymerization.

The previous acrylic composite filaments having latent crimpability have been produced by conjugate spinning two or more polymer solutions having different physical properties, such as heat shrinkage percentage, swelling shrinkage percentage and the like in a side-by-side or sheath-core relation and in order to cause a sufficient difference of the physical properties to develop crimps, two or more copolymers having different copolymerization compositions are used as the conjugate spinning components. However, the thus-produced acrylic fibers are poor in the knot strength, loop strength and elongation, fibrillation resistance, antipilling property, dyeability and the like. In order to obviate these disadvantages the other copolymerizable comonomers should be randomly copolymerized. Accordingly, even in acrylic composite filaments, each component should provide the yarn with properties not having the above described demerits and the comonomers of more than a given amount should be copolymerized.

On the other hand, the shrinkage stress in boiling water of the acrylic fibers is much more poor than that of other synthetic fibers, such as polyamide, polyester and the like, so that an improved crimp developability cannot be obtained unless the difference of the shrinkage percentage is fairly large. However, it is not preferable, in view of physical properties of the composite filament, that an extremely large amount of non-crystalline comonomer is copolymerized as the highly shrinkable component. Namely, if 8 to 12 mole percent of acrylate, acrylic acid, acrylamide, methacrylate, vinyl acetate, allylsulfonic acid or the salts thereof are copolymerized in order to give a high shrinkage, the softening point of the fiber is reduced and the elongation elasticity, Young's modulus and compression elasticity are deteriorated by the heat treatment under relaxed state when developing crimps. Thus it is not quite proper to employ a large amount of non-crystalline comonomer as the highly shrinkable component of the composite filament and as far as it is attempted to develop crimps by utilizing the difference of the heat shrinkage percentage, these disadvantages have not been fully overcome. That is, if the comonomer amount of the highly shrinkable component is lower, the yarn properties as described above are not fully satisfied and if two or more copolymers obtained from comonomers having different abilities for providing shrinkability in substantially the same composition are used, the individual yarn property can be obtained but the adhesion, dyeability and the like are considerably different and such composite filaments are not practicable. To solve these disadvantages, for example, there has been proposed in Japanese Pat. No. 537,975 a procedure in which two spinning solutions having different concentrations of the same polymer are conjugate spun but the difference of the heat shrinkage percentage due to only the difference of coagulating property is small and composite filaments having an excellent crimpability cannot be obtained. Furthermore, the process wherein the crimp number is increased by an after treatment, such as the heat treatment after spinning without varying the comonomer amount, has been proposed. For example, Japanese Pat. No. 523,769 discloses that the composite filament after spinning, drawing and drying is shrunk under relaxed state and further secondarily drawn to enlarge the difference of the stress recovery percentage and to increase the crimp number, but in this process the crimp diameter becomes smaller than that prior to the treatment and the bulkiness is poor and the touch is rigid and the feeling is deteriorated.

In addition, it has been attempted that acrylonitrile is grafted or blocked with a certain comonomer to produce one of the polymers to be conjugate spun, but the comonomer is limited and catalysts and complicated polymerization steps are required and the cost is high, and consequently such a means is difficult to practice industrially. Similarly, there has been proposed a process wherein the spinning solution of a blend of two or more polymers is used as one component to be conjugate spun and the crimps are developed, whereby the yarn properties are improved, but in this process the compatibility is poor and there are problems in view of the adhesion, gloss, knot strength and the like. Recently, it has been proposed to solve the problem of compatibility by blending two copolymers to be conjugate spun, or one of said two polymers, a copolymer wherein acrylonitrile is graft copolymerized with a comonomer, but such a procedure is complicated and is not easily practiced industrially.

As mentioned above, there are various problems in acrylic composite filaments in which crimps are developed by utilizing the difference of heat shrinkage percentage. A process has been demanded wherein usual monomers are used in the minimum amount necessary for obtaining the practical yarn properties, wherein the polymer can be produced by a simple polymerization process by means of usual radical catalyst without using a particular polymerization process and further wherein composite filaments having an excellent crimpability can be obtained.

The inventors have studied with respect to the polymers for producing the composite filaments, which solve these various disadvantages in yarn properties and crimp development of acrylic composite filaments, which have adequate crimp developability employing a small amount of comonomer and which are excellent in knot strength, loop strength and elongation, Young's modulus and crimpability and as the result the present invention has been accomplished.

An object of the present invention is to provide acrylic composite filaments having an excellent bulkiness.

Another object is to provide composite filaments having excellent knot strength ratio, knot elongation, a high Young's modulus and a high elongation elasticity even after a heat treatment under relaxed state for developing crimps.

A further object is to provide the copolymer in which the shrinkage percentage is not substantially varied by the amount of the comonomer to be added.

The other object is to provide acrylic polymer provided with the above described properties and having high compatibility and devitrification resistance.

A further object is to provide a process for copolymerizing such an acrylic polymer.

Figure 2:
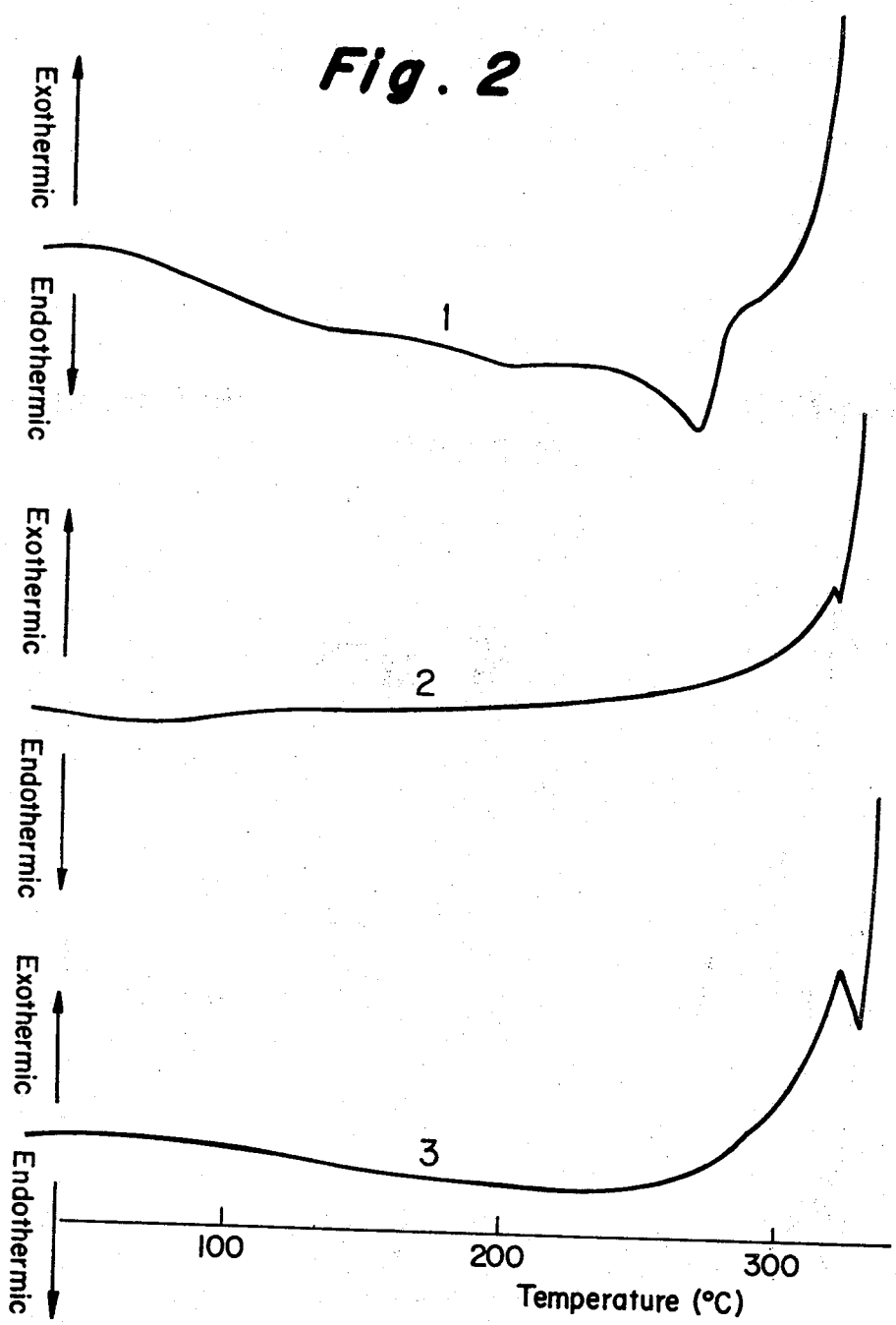

For a better understanding of the invention, reference is taken to the accompanying drawings, wherein:

FIG. 1 is a graph showing the relation of the copolymerization ratio of the acrylate and the shrinkage percentage in boiling water of the fiber composed of usual random copolymer and the fiber composed of the copolymer according to the present invention; and FIG. 2 is a graph of the differential thermal analysis curves of the usual random copolymer of acrylonitrile and 2-ethylhexyl acrylate (Curve 1), polyacrylonitrile (Curve 2) and the copolymer of acrylonitrile and 2-ethylhexyl acrylate of the present invention (Curve 3).

The present invention consists in acrylic composite filaments having a latent crimpability in which two fiber-forming acrylic polymer components $(C_1)$ and $(C_2)$ are bonded in a side-by-side relation. As the component $(C_1)$ there is used a polymer (B). Polymer (B) is obtained by polymerizing monomer mainly consisting of acrylonitrile until the a polymerization conversion of said monomer reaches 30 to 70 percent and then adding 5 to 20 percent by weight of acrylate represented by the general formula

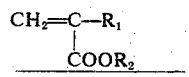

wherein $R_1$ is hydrogen or methyl group, and $R_2$ is an alkyl group having five to nine carbon atoms or an aralkyl group, which may be substitited on the aryl with alkyl or not substituted, wherein the total number of carbons in the alkylene group in the aralkyl group and the substituted alkyl groups is 1 to 6 and further said alkylene group and the substituted alkyl groups are straight chain, and then copolymerizing the resulting mixture. As the other component $(C_2)$ of the composite filament, there is used a copolymer (R) obtained by randomly copolymerizing acrylonitrile with not more than 20% by weight of an acrylate. The conjugate ratio of said components $(C_1)$ and $(C_2)$ is 70:30 to 30:70.

The acrylates represented by the above described formula for component $(C_1)$ include amyl acrylate, hexyl acrylate, 2-ethylhexyl acrylate, heptyl acrylate, octyl acrylate, nonyl acrylate, amyl methacrylate, hexyl methacrylate, 2-ethylhexyl methacrylate, heptyl methacrylate, octyl methacrylate, nonyl methacrylate, benzyl acrylate, phenethyl acrylate, benzyl methacrylate, phenethyl methacrylate, p-methylbenzyl acrylate, p-ethylbenzyl acrylate, p-propylbenzyl acrylate, p-butylbenzyl acrylate, p-amylbenzyl acrylate, p-methylbenzyl methacrylate, p-ethylbenzyl methacrylate, p-propylbenzyl methacrylate and p-butylbenzyl methacrylate.

On the other hand, the acrylates to be used in the production of the above described random copolymers for component $(C_2)$ include methyl acrylate, ethyl acrylate, propyl acrylate, isopropyl acrylate, butyl acrylate, amyl acrylate, hexyl acrylate, 2-ethylhexyl acrylate, heptyl acrylate, octyl acrylate, nonyl acrylate, methyl methacrylate, ethyl methacrylate, propyl methacrylate, isopropyl methacrylate, butyl methacrylate, amyl methacrylate, hexyl methacrylate, 2-ethylhexyl methacrylate, heptyl methacrylate, octyl methacrylate, nonyl methacrylate, benzyl acrylate, phenethyl acrylate, benzyl methacrylate, phenethyl methacrylate, p-methylbenzyl acrylate, p-ethylbenzyl acrylate, p-propylbenzyl acrylate, p-butylbenzyl acrylate, p-amylbenzyl acrylate, p-hexylbenzyl acrylate, p-methylbenzyl methacrylate, p-ethylbenzyl methacrylate, p-propylbenzyl methacrylate and p-butylbenzyl methacrylate.

The above described polymer (B) and random copolymer (R) can be copolymerized with less than 5 percent by weight, based on the total amount of polymer, of allyl sulfonic acid, vinyl sulfonic acid, vinyl benzenesulfonic acid, allyl benzensulfonic acid or sodium, potassium, ammonium and amine salts of these acids.

In the above described general formula of acrylates, when $R_2$ is an alkyl group, the carbon number is 5 to 9 and when $R_2$ is aralkyl group, the total carbon number of alkylene group and substituted alkyl groups is 1 to 6. When $R_2$ is the alkyl group, a high antipilling property cannot be obtained if the carbon number is less than 5 and as the carbon number increases, the yarn properties are improved and the addition of a small amount of the comonomer is sufficient. In the case $R_2$ is alkyl having 10 or more carbon number, the copolymerization activity noticeably lowers and an extremely long time is necessary for the polymerization. The unpolymerized monomer is high in its boiling point and the recovery and removal of same are difficult and consequently the gloss of the resulting fiber is deteriorated.

On the other hand, when $R_2$ is the aralkyl group, even if the total carbon number of the above described alkylene group and the substituted alkyl group is as low as 1 such acrylates have the required activity. If the carbon number increases, the copolymerization activity decreases, the same as in the case where $R_2$ is an alkyl group, so that the carbon number is preferred to be 1 to 6.

Unsaturated monomers copolymerizable with acrylonitrile other than the acrylates similarly can improve the yarn properties but the resulting fibers are poor in gloss and the shrinkage stress upon developing crimps. The advantages of the present invention cannot be obtained if such other unsaturated monomers are employed.

As shown in FIG. 1, the fiber composed of the above described polymer (B) does not substantially vary in its heat shrinkage percentage due to changing the amount of the acrylate comonomer represented by the above general formula (copolymerization ratio).

The polymer (B) is produced as follows. Monomer mainly consisting of acrylonitrile is previously polymerized alone to a polymerization conversion of 30 to 70 percent and to the polymerization system containing unreacted acrylonitrile monomer there is added 5 to 20 percent by weight of the acrylate comonomer (referred to as "comonomer" hereinafter) and the resulting mixture is then copolymerized. Accordingly, the structure of the resulting polymer varies depending upon the polymerization conversion of acrylonitrile monomer and the addition rate of the comonomer.

The polymerization process may include any of emulsion process, slurry process and solution polymerization process. The process can be selected properly by considering the solubility of the comonomer and the reactivity of the comonomer with acrylonitrile monomer, but the most excellent results can be attained when the solution polymerization process is adopted and such a process is the most easy in view of the subsequent spinning process and is the most preferable.

The polymer obtained by the solution polymerization process is more excellent in the spinnability than the polymers obtained by the other processes and the resulting fiber is not devitrified and therefore is rich in the gloss.

The solvents to be used in the solution polymerization are preferred to be organic solvents and to have a small chain transfer constant, such as dimethylsulfoxide, ethylene carbonate and the like, dimethylformamide (abbreviated as DMF hereinafter) and dimethylacetamide. Any of these solvents can also be used as the solvent for the spinning solution. In the polymerization, the charge concentration of the monomer is 20 to 80 percent by weight but in the solution polymerization employing DMF, the polymerization in a high concentration is preferred in view of the reaction rate and the copolymerization efficiency. Particularly if the polymerization is effected at a concentration of 60 to 75 percent, when the polymerization conversion reaches more than 30 percent, the content becomes powdery state or mass state and if the acrylate comonomer is then added, the most excellent polymer can be obtained in a short time and in a high yield.

In such a reaction, the use of a kneader is preferred and the liquid, slurry or powder can be thoroughly stirred and after the polymerization system becomes powdery state, the comonomer is added dropwise, whereby the present invention can be easily carried out.

When the comonomer is added at the stage of less than 30 percent of polymerization conversion of the starting acrylonitrile, only a final polymer having a structure similar to the usual random copolymer is obtained and there cannot be obtained a final polymer showing the variety of properties which will be possessed by the final polymer wherein the polyacrylonitrile units and the units having a high comonomer composition are bonded in a block state. Namely, in the resulting fiber, Young's modulus and elongation elasticity are low and gloss is not excellent. For the stated purpose, it is more preferable to add the comonomer when the polymerization conversion reaches of the starting acrylonitrile more than 40 percent and the upper limit should be not more than 70 percent. Namely, when the polymerization conversion of the starting acrylonitrile is more than 70 percent, the polymerization rate decreases and a homopolymer or a polymer having a structure similar to the homopolymer is liable to be produced in some of the comonomer, a spinning solution of a blend of polyacrylonitrile and such homopolymer of the comonomer is formed and in many cases gelation occurs. Furthermore, in the resulting fiber, the knot strength and the loop strength and elongation are reduced and the fibrillation resistance and the antipilling property decrease and the gloss becomes lower. Accordingly, it is impossible to obtain the composite filament which is the object of the present invention. Thus, the addition of the comonomer should be effected at the polymerization conversion of acrylonitrile of 30 to 70 percent, preferably 40 to 60 percent.

The polymerization conversion is determined as follows. A sample of 0.5 g is taken out from the polymerization system in the solution polymerization and then formed into a film, which is coagulated with methanol and washed and further washed with boiling water for 30 minutes and then dried and the resulting film is weighed. The ratio of the weight of the film to the weight of the monomer is the percentage of polymerization conversion.

If the load on the motor of the stirrer when the taken out sample is stirred and the relation of such load to the conversion is determined, the measurement of the conversion in the following polymerizations is not always necessary. However, when the monomer concentration and the catalyst amount vary and the polymerization rate varies, it is necessary to effect again the measurement.

In the addition of the comonomer, the total amount of same can be added at one time when the copolymerizing activity of it with acrylonitrile is good and the formation of the homopolymer does not substantially occur, but a more preferable result can be obtained by adding a small amount of the comonomer continuously. In the case of the solution polymerization at a high concentration of acrylonitrile, as the polymerization proceeds, the polymerization system converts to the form of bulk polymerization, so that when a large amount of liquid comonomer is added at one time, the phase returns to a slurry state and as the polymerization proceeds, the polymerization system converts again into the powdery state which is difficult in the temperature control, so that such a means is not preferable. The addition rate varies depending upon the polymerization rate owing to the reactivity of the comonomer, polymerization process and the like but the comonomer is added so as to obtain the given copolymerization composition at a rate of about 0.01 to 2 mol%/hr. in the slurry polymerization and at a rate of about 0.05 to 1 mol%/hr. in the solution polymerization. The comonomer may be added alone, but it is preferred that it contains a catalyst. Particularly, when a comonomer having a low copolymerization activity or a comonomer which decreases the polymerization rate is added, it is important to select the catalyst to be contained. For the initial polymerization of acrylonitrile monomer, azobis compounds, persulfates, peroxides, for example, azobisisobutyronitrile, azobisdimethylvaleronitrile, ammonium persulfate, potassium persulfate and the like are used. In the addition of the comonomer, the azobis compounds are liable to produce the homopolymer of the comonomer or the polymer having a very high content of the comonomer and therefore a copolymer containing a high molecular weight copolymer unit consisting of acrylonitrile and the comonomer following to the polyacrylonitrile unit cannot be obtained and even if the resulting polymer is soluble in an organic solvent, gelation easily occurs. Therefore, as the catalyst to be contained in the comonomer, the persulfates and peroxides are preferable and for example, ammonium persulfate, potassium persulfate and t-butylperoxypivalate may be used and particularly ammonium persulfate is most preferable.

The thus obtained polymer is very excellent in its spinnability, when such polymer is spun into a coagulation bath of organic solvent-water, particularly when the polymer is extruded into a coagulation bath of dimethylformamide-water, the resulting fiber is hardly devitrified. The coagulations bath condition suitable for spinning are very broad and high speed spinning can be effected. Moreover, even if the undried drawn filament is treated with hot water or steam under relaxed state, the filament is not devitrified and therefore the treating process can be simplified and the yarn properties of the object of the present invention can be remarkably improved. When the viscosity of the spinning solution of the polymer is too high even in the appropriate concentration, the appropriate viscosity may be attained by mixing random copolymer of not more than 60 percent by weight but the resulting fiber is reduced in Young's modulus.

The conjugate ratio is 70:30 to 30:70, particularly 60:40 to 40:60. The most preferable combination of the polymer (B) and the random copolymer (R), is the case in which the comonomer content in both the polymers is equal and the conjugate ratio of said combination is 50:50 to 60:40. In this case, the amount of the comonomer in the components $C_1$ and $C_2$ is equal, so that the adhesion is excellent and it is merely necessary for both of the components $C_1$ and $C_2$ to contain the minimum amount of the comonomer necessary for obtaining the desired yarn properties and it is not necessary in order to develop crimps to increase unduly the amount of the comonomer in the highly shrinkable component.

This reason will be more clearly understood from FIG. 1. In FIG. 1, the curves represent the shrinkage percentages in boiling water of the random copolymer (R) and the polymer (B) respectively. As seen from this drawing, the shrinkage percentages in boiling water of the filaments obtained by spinning the above polymers (R) and (B) under the same condition have a sufficient difference to develop crimps by the treatment with boiling water or steam.

The spinning process of the composite filament is carried out as follows. The spinning solution is extruded into a coagulation bath of a solvent-water and then passed through a plurality of drawing baths, wherein the concentration is gradually decreased and the temperature is gradually increased, to draw the filament to 5 to 15 times its original length and then the drawn filament is dried with dry heat and wound up. Alternatively, when the undried drawn filament is treated with boiling water or steam under relaxed state and then dried by utilizing the characteristic of the high devitrification resistance, a composite filament not developing crimps but having satisfactory knot strength and loop strength and elongation can be obtained. If these processes are adopted, a mechanical crimping may be directly given and the resulting filament can be applied to the spinning. The drawn and dried filament is heat treated under relaxed state and under such a stress that crimps are not developed or after developing crimps, the crimps are partially eliminated by drawing, after which the thus treated filament is subjected to spinning. The composite filament obtained by the present invention may develop excellent crimpability in the following step for providing bulkiness.

The two component polymers to be bonded in the present invention should have a difference of the shrinkage percentage in boiling water of at least 2 percent when effecting the spinning under the same condition. When the difference of the shrinkage percentage in boiling water is less than 2 percent, the crimp number and the diameter of crimp are small and the crimpability is poor.

The polymer B of the present invention is assumed to be a mixture of a block polymer containing acrylonitrile homopolymer and a random copolymer composed of acrylonitrile monomer and the acrylate comonomer, a graft polymer wherein the acrylate is graft copolymerized acrylonitrile homopolymer and a random copolymer consisting of acrylonitrile monomer and acrylate. In general, when solutions of two or more such polymers are prepared separately and are mixed, phase separation is liable to occur. When the mixed polymer solution is extruded into a coagulation bath in a wet spinning process, phase separation occurs noticeably and the structure of the coagulated product is very coarse and the resulting fiber is high in devitrification. Even when each polymer compound of the above described polymer mixture (B) is previously separately prepared and these polymers are mixed, only a very coarse coagulated structure is obtained and the silky gloss as in the composite filament fiber of the present invention cannot be obtained. However, the polymer according to the present invention is improved in the devitrification resistance and the acrylic synthetic fiber having a very excellent gloss can be obtained.

The fiber composed of the thus obtained polymer does not substantially vary in its shrinkage percentage in boiling water due to amount of the comonomer added.

Accordingly, it is possible to select the most desirable composition freely in view of the yarn properties, adhesion and dyeability. In general, in the prior art processes, as the amount of the comonomer increases, the resulting composite filament shows a higher shrinkability by heating and the knot strength and the loop strength and elongation are improved and the crimp number increases. On the other hand, the Young's modulus, the elongation recovery and the properties after heating lower. Particularly, these properties lower considerably by the heat treatment under relaxed state, while the tensile elongation increases unduly, so that the crimp recovery and the feeling of the composite filament are not preferable. Namely, the increase of the comonomer in order to increase the knot strength and loop strength and elongation and heat shrinkage percentage, decreases the elastic properties and Young's modulus. Whereas, the fiber obtained by wet spinning of the polymer (B) according to the present invention is high in its elastic recovery in 5 percent elongation and this property may be rather improved by the heat treatment under relaxed state, for example, steam. Furthermore, the decrease of the Young's modulus due to the wet heat treatment under relaxed state is small and less than 20 percent, usually 2 to 10 percent. The absolute value is at least 400 $Kg/mm^2$ and the loop elongation is more than 20 percent. On the other hand, when the random copolymer of both the components is spun, if the Young's modulus is 400 $Kg/mm^2$, the loop elongation is only about 10 percent and when the temperature of the heat treatment unde relaxed state is further increased and the loop elongation is increased to 20 percent, the Young's modulus decreases to 200 $Kg/mm^2$. However, the acrylic composite fiber formed from the polymer B according to the present invention has a high loop elongation and a high Young's modulus. The characteristic of the yarn properties of this fiber cannot be obtained by spinning a blend of the random copolymer of acrylonitrile and the acrylate, polyacrylonitrile and homopolymer of the acrylate.

Namely, when the polymers are blended, the solubility to the solvent and the coagulating property in the coagulation bath of both polymers are not equal and consequently even if the spinning is effected, it is not possible to obtain the homogeneously dispersed fiber and naturally the effect of the addition of the comonomer cannot be fully developed and the devitrification often occurs and the antipilling property and the fibrillation resistance lower and the knot strength ratio is poor. Such fiber has various demerits of polyacrylonitrile and the non-uniformity of the yarn properties increases owing to the blending.

As compared with the random copolymer, in spite of the fact that the shrinkage percentage in boiling water of the polymer (B) is very small, the shrinkage stress in boiling water is large, for example, the shrinkage stress of the polymer (B) is 200 to 300 mg/d, while that of the random copolymer (R) is 50 to 150 mg/d. The differential thermal analysis results of the random copolymer of acrylonitrile and 2-ethylhexyl acrylate (Curve 1), polyacrylonitrile (Curve 2) and the polymer (B) of acrylonitrile and 2-ethylhexyl acrylate (Curve 3) are shown in FIG. 2. As seen from FIG. 2, the polymer (B) does not substantially cause "exothermic" of lower than 100° C and does not substantially cause "endothermic" until the decomposition point of the high temperature side.

The coagulation bath of an organic solvent-water is high in the coagulating property and the devitrification hardly occurs and the voids in the cross section of the fiber are very few and the transparency and gloss are improved by the heat treatment under relaxed state for giving the elongation or developing crimps. The knot strength ratio becomes more than 90 percent by steam treatment at 110°C and usually more than 100 percent. As mentioned above, the elastic recovery at 5 percent elongation may be improved by the steam treatment under relaxed state and even in the case it decreases, the percentage of decrease is very slight and it shows the characteristic of the fiber of the polymer (B) that the value is 85 to 90 percent, while the random copolymer decreases considerably the value through the similar treatment. In general it is easy to obtain a fiber having the elastic recovery at 5 percent elongation of 80 to 90 percent in the fiber after spinning, drawing and drying but the value decreases to about 70 to 80 percent by the heat treatment under relaxed state. The decrease rate becomes larger as the copolymerization ratio of the comonomer increases. In order to obtain the excellent crimp elasticity of the composite filament, it is desirable to be high in the elongation elasticity and Young's modulus of the highly shrinkable component. However, in the acrylic composite filament, the amount of the comonomer in the highly shrinkable component is high, so that the elongation elasticity and Young's modulus are low and therefore the crimp elasticity is low.

However, according to the present invention, the crimps can be developed when the amount of the comonomer is the minimum necessary for obtaining the yarn properties and the difference of shrinkage percentage and therefore the decrease of Young's modulus and elongation elasticity can be prevented. The polymer (B) has a high Young's modulus and the elongation elasticity which are not decreased by the heat treatment under relaxed state, so that a composite filament having a very excellent elasticity can be obtained.

A further explanation will be made with respect to the most important crimp property. Firstly, the bulkiness is excellent. Namely, as seen from the fact that the crimp percentage is large as compared with the crimp number, the crimp diameter is large. Therefore, when the composite filaments are mixed with single component filaments and then the crimps are developed by the steam treatment, although the linear shrinkage percentage of the composite filament is not extremely large, the crimp diameter is large, so that a high bulkiness and the pleasant feeling can be obtained. The crimp elasticity is more than 85 percent and in many cases more than 90 percent. The recovery of crimps in the steam treatment after the crimps are eliminated by a cold drawing is excellent and the size of the reversible crimp diameter is retained. The crimp number is 10 to 25 and the crimp diameter is more than 0.35 mm$\phi$, preferably more than 0.4 mm$\phi$.

The compression elasticity of a sample obtained by mixing the single component filament composed of acrylic polymer containing 8 percent of methyl acrylate and the crimped filament obtained by the present invention in a ratio of 50:50 is 30 to 40 percent, the compression elasticity of the single component filament is 18 percent and the compression elasticity of a sample obtained by mixing the above described single component filament and crimped filament having a crimp number of 37/25 mm and a crimp percentage of 27 percent obtained by conjugate spinning two random copolymers in which acrylonitrile is subjected to a random copolymerization with 8 percent of methyl acrylate and 11 percent of methyl acrylate respectively, in ratio of 50:50 is 24 percent and the compression elasticity of the former sample is very excellent as compared with those of the latter two samples. The former sample is excellent in the fibrillation resistance and antipilling property and is provided with many characteristics as acrylic composite filament. This sample has a moderate waxy touch and is excellent in silk-like feeling.

Particularly, when the polymer (B) appears on the surface of the crimps as the lower shrinkable component, the effect is remarkable and the crimped filaments can be used as the spinning yarn of knitted goods, while since a plurality of demerits in acrylic composite filaments are improved, excellent properties can be developed as woven fabrics.

The tensile, knot and loop strength and elongation of the fibers are determined following to JIS L-1073 and 1074 and the crimping property is determined following to JIS L-1077. The crimp diameter is determined by the observation of microscope.

The following examples are given in illustration of this invention and are not intended as limitations thereof. In the examples "part" and "%" mean by weight.

EXAMPLE 1

In 50 parts of dimethylformaide were dissolved 99 parts of acrylonitrile, 1 part of sodium allylsulfonate, 0.08 part of azobisdimethylvaleronitrile and 0.3 part of dodecylmercaptan, and the resulting solution was subjected to a polymerization reaction at 43°C for about 3 hours under gaseous nitrogen atmosphere in a small kneader. The polymerization system became powdery state. The conversion of the monomer into the polymer was 47 percent. After the polymerization system was heated up to 50°C, 7.5 parts of 2-ethylhexyl acrylate containing 0.3 percent of ammonium persulfate was added dropwise to the kneader in 2 hours. The resulting mixture was further heated at 50°C for 3 hours and then cooled to room temperature to obtain a polymer (B-7) containing about 30 percent of the solvent. The resulting polymer was dissolved in dimethylformamide to prepare a spinning solution having a polymer concentration of 20 percent. The above described polymerization reaction was repeated in the exactly same manner, except that 15 parts of 2-ethylhexyl acrylate was used, to obtain a polymer (B-13). The resulting polymer was dissolved in dimethylformamide to prepare a spinning solution having a polymer concentration of 20 percent.

Next, 99 parts of acrylonitrile, 1 part of sodium allylsulfonate, 7.5 parts of 2-ethylhexyl acrylate and 0.022 part of azobisdimethylvaleronitrile were dissolved in 50 parts of dimethylformamide, and the resulting solution was subjected to a polymerization reaction at 43°C for 3 hours and further at 50°C for 5 hours under gaseous nitrogen atmosphere in a small kneader to obtain a random copolymer (R-7). The resulting copolymer was dissolved in dimethylformamide to prepare a spinning solution having a polymer concentration of 20 percent. Random copolymers (R-8), and (R-13) containing 8 percent and 13 percent respectively of 2-ethylhexyl acrylate were prepared in the same manner and dissolved in dimethylformamide to prepare spinning solutions having a polymer concentration of 20 percent.

Thus obtained spinning solutions were conjugate spun in a combination as shown in the following Table 1 in a conjugate ratio of 1:1 and in a side-by-side relation. In the conjugate spinning, 60 percent aqueous solution of dimethylformamide kept at 15°C was used as a coagulation bath, and the coagulated filament was drawn to 4 times its original length in 30 percent aqueous solution of dimethylformamide kept at 60°C and further drawn to 3 times its original length in 10 percent aqueous solution of dimethylformaide kept at 95°C. The drawn filament was shrunk by 15 percent with boiling water and dried at 100°C with dry heat under a constant length.

The resulting composite filament was treated with steam at 110°C for 10 minutes under relaxed state. The combination of the polymers and the yarn properties and crimping properties of the thus treated filament are shown in the following Table 1. In Table 1, percentage in parentheses means a weight ratio of polymers in blend.

When two random copolymers were conjugate spun as shown in Sample No. 1 or 2, the resulting composite filament was devitrified by the shrinking treatment with boiling water, but in the case of Sample Nos. 3 and 4, such devitrification phenomenon did not occur at all.

As seen from Table 1, when two random copolymers are conjugate spun, if the difference of composition between the two copolymers is small as in the case of Sample No. 1, crimps do not substantially develop in the resulting composite filament due to small difference of heat shrinkability between the two copolymers, and therefore it is necessary to use a highly shrinkable component containing a large amount of comonomer as shown in Sample No. 2. However, such composite filament is poor in the crimp retaining property due to its high elongation, low Young's modulus and poor elongation elasticity, and causes deformation of textile products prepared from the composite filament. On the contrary, the composite filaments shown in Sample Nos. 3 and 4, which were obtained by a combination of the polymer according to the present invention and the random copolymor, have excellent yarn properties and crimping properties and further have a wool-like texture. When each of these composite filaments was spun into spun yarns, which were then made into knitted goods, the resulting knitted goods were excellent in bulkiness and had somewhat waxy touch and a wool-like touch.

Knitted goods were prepared from the composite filaments of Sample Nos. 2, and subjected to an antipilling test by means of an I.C.I. type pilling tester to determine the pilling grade. The pilling grade of the knitted goods of Sample No. 2 was 1 - 2 grade, and that of Sample No. 4 was 4 - 5 grade. The "pilling grade" measured by an I.C.I. type pilling tester is classified into the following 5 grades.

Grade
5 : pill does not occur at all.
4 : pills occur slightly.
3 : pills occur, but do not cause troubles in practical operation.
2 : pills occur, and cause troubles in practical operation.
1 : a considerably large amount of pills occur.

EXAMPLE 2

Polymers were prepared in the same manner as described in the production of the polymer (B-7) of Example 1. However, in this Example 2, after acrylonitrile and sodium allylsulfonate were polymerized for 2 hours, 2-ethylhexyl acrylate containing 0.3 percent of a catalyst of (2-1) azobisisobutyronitrile, (2-2) azobis-

TABLE 1

| Sample No. | Component polymer for conjugate spinning | Amount of polymer B in composite filament (percent) | Elongation (percent) | Knot strength ratio (percent) | Young's modulus (kg./mm.$^2$) | Elasticity at 50% elongation (percent) | Number of crimps per 25 mm. | Diameter of crimp (mm.) |
|---|---|---|---|---|---|---|---|---|
| 1 | R-7, R-8 | 0 | 49 | 64.5 | 320 | 74 | not more than 5. | |
| 2 | R-7, R-13 | 0 | 61 | 81.7 | 226 | 71 | 26.5 | 0.17 |
| 3 | B-7, R-7 | 50 | 40 | 89.4 | 429 | 82 | 14.3 | .40 |
| 4 | B-13, R-8 | 50 | 36 | 88.4 | 418 | 87 | 15.8 | .42 | dimethylvaleronitrile, (2–3) t-butyl peroxypivalate or (2–4) ammonium persulfate was added dropwise to the polymerization system, and heating was further continued at 50°C for 5 hours while stirring to obtain 4 kinds of polymers. The resulting polymers were dissolved in dimethylformamide to prepare polymer solutions having a polymer concentration of 19 percent.

The polymer solution prepared by the use of the catalyst (2–1) or (2–2) had a tendency to gelate, and when the polymer solution was diluted to a polymer concentration of 13 percent, the solution showed a viscosity close to that of commonly used spinning solution. However, even when the diluted polymer solution was spun, it was impossible to produce filaments having excellent yarn properties. While, the polymer solution prepared by the use of the catalyst (2–3) (2–4) was an excellent spinning solution. This polymer solution was extruded into 60 percent aqueous solution of dimethylformamide kept at 10°C to coagulate the extruded filament, and the coagulated filament was drawn to 10 times its original length in 30 percent aqueous solution of dimethyl-formamide kept at 90°C and further drawn to 1.2 time its original length in 10 percent aqueous solution of dimethylformaide kept at 95°C, after which the drawn filament was washed with boiling water under 1.05 time tension, dried at 100°C with dry heat under a constant length and taken up on a bobbin to obtain filament (2-a) or (2-b). Thus obtained filament was treated with steam at 110°C for 10 minutes under relaxed state to obtain filament (2-as) or (2-bs).

Yarn properties of the filaments (2-a), (2-b), (2-as) and (2-bs) are shown in the following Table 2.

TABLE 2

|  | Elongation (%) | Knot strength ratio (%) | Young's modulus (Kg/mm$^2$) | Elasticity at 5% elongation (%) |
|---|---|---|---|---|
| 2-a | 16 | 35 | 603 | 89.1 |
| 2-b | 18 | 38 | 567 | 88.9 |
| 2-as | 29 | 92 | 487 | 88.4 |
| 2-bs | 31 | 98 | 502 | 88.1 |

Next, the above described polymer solution prepared by the use of the catalyst (2–3) or (2–4) was treated in the same manner as described above, except that the drawn filament was shrunk by 15 percent with boiling water without effecting the boiling water treatment under the tension, to obtain filament (2-a') or (2-b'), which was then treated with steam at 110°C for 10 minutes under relaxed state to obtain filament (2-a's) or (2-b's).

Yarn properties of the filaments (2-a'), (2-b'), (2-a's) and (2-b's) are shown in the following Table 3.

TABLE 3

| Filament | Elongation (%) | Knot strength ratio (%) | Young's modulus (Kg/mm$^2$) | Elasticity at 5% elongation (%) |
|---|---|---|---|---|
| 2-a' | 23 | 81 | 421 | 84.1 |
| 2-b' | 28 | 82 | 476 | 85.2 |
| 2-a's | 33 | 99 | 410 | 89.8 |
| 2-b's | 38 | 104 | 437 | 90.6 |

As seen from Table 2, even when the filament consisting of the polymer according to the present invention is treated with steam under relaxed state, decrease of Young's modulus is small, and moreover decrease of elasticity at 5 percent elongation is very small. Further, comparison of Table 3 with Table 2 shows that when the drawn filament is subjected to the shrinking treatment with boiling water and further is treated with steam under relaxed state, the resulting filaments are more improved in the yarn properties than the case when the drawn filament is subjected to the boiling water treatment under the tension and further is treated with steam under relaxed state. Particularly, Table 3 shows that the elasticity at 5 percent elongation of the filament, which was previously subjected to the boiling water shrinking treatment, can be improved by the treatment with steam under relaxed state.

EXAMPLE 3

In 50 parts of dimethylformamide were dissolved 99 parts of acrylonitrile, 1 part of sodium allylsulfonate and 0.08 part of azobisdimethylvaleronitrile, and the resulting solution was subjected to a polymerization reaction at 43°C under gaseous nitrogen atmosphere in a small kneader by varying the previous polymerization time as follows. Namely, 1 hour, 2.5 hours, 4 hours and 7 hours after the starting of the polymerization reaction, 11 parts of benzyl acrylate containing 0.1 percent of t-butyl peroxypivalate was added thereto at a rate of 0.25 mol/hr. to prepare four kinds of polymers (3-1B), (3-2B), (3-3B) and (3-4B), respectively. The polymerization temperature was raised up to 50°C simultaneously with the starting of the addition of the benzyl acrylate, and the total polymerization time was 8 hours. In each polymerization reaction, polymer sample was taken out before starting the addition of the benzyl acrylate, and polymerization conversion was determined and found to be 17.2 percent, 43.4 percent, 65.1 percent and 87.5 percent, respectively.

When the above obtained three polymers (3-1B), (3-2B) and (3-3B) were dissolved in dimethylformamide to prepare spinning solutions having a proper viscosity for spinning of 40 to 60 poises at 60°C, the spinning solutions had polymer concentrations of 21 percent, 19 percent and 18 percent, respectively. However, in the polymer (3-4B), gelation occurs even at a polymer concentration of 14 percent, and spinning was very difficult.

Next, 89 parts of acrylonitrile, 10 parts of benzyl acrylate, 1 part of sodium allylsulfonate and 0.1 part of azobisdimethylvaleronitrile were dissolved in 50 parts of dimethylformamide, and the resulting solution was subjected to a polymerization reaction at 43°C for 3 hours and further at 50°C for 5 hours under gaseous nitrogen atmosphere in a small kneader to obtain a random copolymer (3-R). When the copolymer (3-R) was dissolved in dimethylformamide to prepare a spinning solution having a polymer concentration of 20 percent, the solution had a proper viscosity for spinning. The four spinning solutions of the polymers (3-1B), (3-2B), (3-3B) and (3-R) were extruded into 62 percent aqueous solution of dimethylformamide at 15°C, and the extruded filaments were drawn to 4.0 times their original length in 30 percent aqueous solution of dimethylformamide at 60°C and further drawn to 2.8 times their original length in 10 percent aqueous solution of dimethylformamide at 95°C, after which the drawn filaments were shrunk by 16 percent with boiling water, dried at 100°C with dry heat and taken up on a bobbin. While, in the case of the polymer (3-4B), the first drawing ratio was 4 times and the second drawing ratio was 2.1 times, and consequently total draw ratio was only 8.4 times. Yarn properties of thus obtained filaments are shown in the following Table 4.

Further, the filaments were treated with steam at 110°C under relaxed state, and yarn properties of thus treated filaments are shown in the following Table 5.

TABLE 4

| Filament | Strength (g/d) | Knot strength ratio (%) | Young's modulus (Kg/mm²) | Elasticity at 5% elongation (%) |
|---|---|---|---|---|
| 3-1B | 4.8 | 47 | 623 | 85.1 |
| 3-2B | 4.6 | 87 | 487 | 88.2 |
| 3-3B | 4.1 | 88 | 532 | 89.2 |
| 3-4B | 2.3 | 40 | 489 | 83.1 |
| 3-R | 5.2 | 43 | 633 | 85.4 |

TABLE 5

| Filament | Strength (g/d) | Knot strength ratio (%) | Young's modulus (Kg/mm²) | Elasticity at 5% elongation (%) |
|---|---|---|---|---|
| 3-1BS | 4.3 | 72 | 322 | 81.6 |
| 3-2BS | 3.7 | 101 | 456 | 89.3 |
| 3-3BS | 3.5 | 107 | 493 | 90.2 |
| 3-4BS | 2.0 | 66 | 262 | 71.4 |
| 3-RS | 4.5 | 72 | 284 | 75.9 |

As seen from Table 4, there is substantially no difference in the yarn properties between the filament consisting of the polymer (3-1B) obtained by adding the comonomer of benzyl acrylate to the polymerization system before the conversion reaches 30 percent defined in the present invention and the filament consisting of the random copolymer (3-R) obtained by mixing benzyl acrylate and acrylonitrile at the beginning of the polymerization reaction, and consequently filaments aimed in the present invention cannot be obtained by adding the comonomer to the polymerization system before the conversion reaches 30 percent. While, the polymer (3-4B) obtained by adding benzyl acrylate to the polymerization system at a conversion of 87.5 percent, which is beyond the upper limit conversion of 70 percent defined in the present invention, is difficult in spinning and moreover the spun filament is poor in the yarn properties.

Further, as seen from Table 5, only in the filaments consisting of the polymers (3-2Bs) and (3-3Bs) according to the present invention, the elasticity at 5 percent elongation is improved by the treatment with steam under relaxed state, and the decrease of Young's modulus by the treatment is small.

The spinning solution of the random copolymer (3-R) containing 10 percent of benzyl acrylate and that of the polymer (3-2B) or (3-3B) were conjugate spun in a conjugate ratio of 1:1 in a side-by-side relation under the same condition as described in the spinning of the above described signal component filament. Further, as a control, a spinning solution of a random copolymer (3-R') containing 7 percent of benzyl acrylate was prepared in the same manner as described in the random copolymer (3-R). The spinning solution of the copolymer (3-R') and that of the copolymer (3-R) were conjugate spun in the same manner.

Thus obtained three composite filaments were treated at 120°C with steam under relaxed state to develop crimps. In the composite filaments obtained by combining the polymers (3-2B) and (3-R), (3-3B) and (3-R), and (3-R) and (3-R'), the number of crimps per 25 mm were 21.3, 19.7 and 28.3 respectively, and the diameters of the crimps were 0.38 mm, 0.43 mm and 0.22 mm, respectively. The composite filaments obtained by combining the polymers (3-2B) and (3-R), and (3-3B) and (3-R) were considerably excellent in the bulkiness and had a pleasant waxy touch and an excellent wool-like texture.

EXAMPLE 4

Each of mixtures having a monomer composition as shown in the following Table 6 was polymerized under the condition as described in the following Table 7. The resulting polymers were conjugate spun in a combination as shown in the following Table 8 under the same condition as described in Example 1 to obtain three kinds of composite filaments. The resulting composite filaments were treated with steam at 120°C under relaxed state. The yarn properties of thus treated filaments are shown in the following Table 8.

Further, the above treated filament was cut into staples of 7.5 cm length, and the staples were spun into 32 count double folded spun yarns, which were made into knitted goods. Antipilling property of the knitted goods was tested for 10 hours by means of an I.C.I. type pilling tester. The result is also shown in Table 8.

TABLE 6

| | |
|---|---|
| 4-1B | Acrylonitrile 89%, amyl acrylate 10%, sodium allylsulfonate 1%. |
| 4-1R | Do. |
| 4-2B | Acrylonitrile 90%, heptyl acrylate 9%, sodium allylsulfonate 1%. |
| 4-2R | Do. |
| 4-3B | Acrylonitrile 91%, nonyl acrylate 8%, sodium allylsulfonate 1%. |
| 4-3R | Do. |

Table 7

4-1B, 4-2B and 4-3B

To 70 percent solution of a mixture of acrylonitrile and sodium allylsulfonate in DMF is added 0.07 percent of azobisdimethylvaleronitrile. The resulting solution is subjected to a polymerization reaction at 42°C for 3 hours, and the polymerization system is heated up to 50°C. Then, a mixture of the acrylate and 0.3 percent of ammonium persulfate is added thereto dropwise in 2 hours, and the polymerization reaction is further continued for 2 hours.

4-1R, 4-2R and 4-3R

All the monomers are dissolved in DMF to prepare a solution having a monomer concentration of 35 percent. 0.07 percent of azobisdimethylvaleronitrile is added to the solution. The resulting solution is subjected to a polymerization reaction at 42°C for 3 hours and further at 50°C for 4 hours.

TABLE 8

| | Strength (g/d) | Knot strength ratio (percent) | Young's modulus (Kg/mm²) | Number of crimps per 25 mm | Diameter of crimp (mm) | Antipilling property (grade) |
|---|---|---|---|---|---|---|
| 4-1B/R | 3.3 | 91.3 | 413 | 24.1 | 0.32 | 2-3 |
| 4-2B/R | 3.6 | 94.2 | 429 | 20.3 | .34 | 4 |
| 4-3B/R | 3.1 | 95.6 | 446 | 18.8 | .36 | 4-5 |

As seen from Table 8, all the resulting composite filaments are excellent in the yarn properties and crimping properties. The comonomers having 7 to 9 carbon atoms are considerably effective in the antipilling property. The comonomer having 5 carbon atoms is also effective in the antipilling property, but the effect is somewhat inferior to the effect of the comonomer having 7 to 9 carbon atoms.

EXAMPLE 5

In 50 parts of dimethylformamide were dissolved 99 parts of acrylonitrile, 1 part of sodium allylsulfonate, 0.25 part of azobisdimethylvaleronitrile and 0.4 part of dodecylmercaptan, and the resulting solution was subjected to a polymerization reaction at 43°C for about 4 hours under gaseous nitrogen atmosphere in a small kneader. The polymerization system became powdery state. The polymerization conversion of the monomers at this time was 53 percent. After the polymerization system was heated up to 50°C, 11 parts of benzyl acrylate containing 0.3 percent of ammonium persulfate was added to the kneader dropwise in 2 hours, and heating was further continued for 2 hours, after which the polymerization system was cooled to room temperature to obtain a polymer ($C_1$). The resulting polymer was dissolved in dimethylformamide to prepare a spinning solution having a polymer concentration of 19 percent.

While, 89 parts of acrylonitrile, 10 parts of benzyl acrylate, 1 part of sodium allylsulfonate and 0.2 part of azobisdimethylvaleronitrile were dissolved in 50 parts of dimethylformamide, and the resulting solution was subjected to a polymerization reaction at 43°C for about 3 hours and further at 50°C for 5 hours under gaseous nitrogen atmosphere in a small kneader to obtain a polymer ($C_2$). The resulting polymer was dissolved in dimethylformamide to prepare a spinning solution having a polymer concentration of 20 percent.

Thus obtained polymers ($C_1$) and ($C_2$) were conjugated spun in various conjugate ratios under the same condition as described in Example 1.

The conjugate ratio of the polymer ($C_1$) to the polymer ($C_2$) and the yarn properties of the resulting composite filaments are shown in the following Table 9.

components bonded in side-by-side relation in a conjugation ratio in the range of 70:30 to 30:70, 1. one of said acrylic polymer components consisting essentially of a polymer obtained by polymerizing acrylonitrile until from 30 to 70 percent of acrylonitrile is converted to polymer and then adding 5 to 20 percent by weight of acrylate of the formula

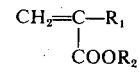

wherein
$R_1$ is H or $CH_3$, and
$R_2$ is alkyl having five to nine carbon atoms, or aralkyl, in which the "ar" is unsubstituted or substituted with alkyl, wherein the total number of carbon atoms in the substituents on "ar" is one to six and said substituents are straight chain,
and then copolymerizing the resulting mixture, and 2. the other of said acrylic polymer components is a random copolymer of acrylonitrile with not more than 20 percent by weight of an acrylate monomer, said other component having a shrinkage in boiling water which is at least 2 percent higher than the shrinkage of said one component.

2. The acrylic composite filament as claimed in claim 1, wherein said acrylate in said one acrylic polymer component is amyl acrylate, hexyl acrylate, 2-ethylhexyl acrylate, heptyl acrylate, octyl acrylate, nonyl acrylate, amyl methacrylate, hexyl methacrylate, 2-ethylhexyl methacrylate, heptyl methacrylate, octyl methacrylate, nonyl methacrylate, benzyl acrylate, phenethyl acrylate, benzyl methacrylate, phenethyl methacrylate, p-methylbenzyl acrylate, p-ethylbenzyl acrylate, p-propylbenzyl acrylate, p-butylbenzyl acrylate, p-amylbenzyl acrylate, p-methylbenzyl methacrylate, p-ethylbenzyl methacrylate, p-propylbenzyl methacrylate or p-butylbenzyl methacrylate.

3. The acrylic composite filaments as claimed in claim 1, wherein said acrylate in said other acrylic polymer component is methyl acrylate, ethyl acrylate, propyl acrylate, isopropyl acrylate, butyl acrylate, amyl acrylate, hexyl acrylate, 2-ethylhexyl acrylate, heptyl acrylate, octyl acrylate, nonyl acrylate, methyl methacry-

TABLE 9

| Filament | Conjugate ratio $C_1:C_2$ | Number of crimps per 25 mm | Diameter of crimp (mm) | Crimp elasticity percentage (percent) | Young's modulus (Kg/mm²) | Elasticity at 5 percent elongation (percent) |
|---|---|---|---|---|---|---|
| 5-1 | 90 10 | not more than 5 | | | 479 | 92 |
| 5-2 | 70 30 | 10.7 | 0.45 | 01.6 | 461 | 88 |
| 5-3 | 60 40 | 12.3 | 0.44 | 91.1 | 452 | 86 |
| 5-4 | 50 50 | 14.9 | 0.42 | 90.6 | 443 | 85 |
| 5-5 | 40 60 | 17.6 | 0.39 | 88.7 | 413 | 84 |
| 5-6 | 30 70 | 15.1 | 0.36 | 86.2 | 384 | 82 |

As seen from Table 9, the composite filaments (5-2) to (5-6) having a conjugate ratio within the range defined according to the present invention have excellent crimping properties and yarn properties. Among them, the filaments (5-3) and (5-4) having conjugate ratios of the polymer ($C_1$): the polymer ($C_2$) of 60:40 and 50:50, respectively, are excellent filaments having well-balanced properties. However, the filament (5-1) develops substantially no crimp.

What is claimed is:

1. Acrylic composite filament having latent crimpability, comprising two fiber-forming acrylic polymer late, ethyl methacrylate, propyl methacrylate, isopropyl methacrylate, butyl methacrylate, amyl methacrylate, hexyl methacrylate, 2-ethylhexyl methacrylate, heptyl methacrylate, octyl methacrylate, nonyl methacrylate, benzyl acrylate, phenethyl acrylate, benzyl methacrylate, phenethyl methacrylate, p-methylbenzyl acrylate, p-ethylbenzyl acrylate, p-propyl benzyl acrylate, p-butylbenzyl acrylate, p-amylbenzyl acrylate, p-hexylbenzyl acrylate, p-methylbenzyl methacrylate, p-ethylbenzyl methacrylate, p-propylbenzyl methacrylate or p-butylbenzyl methacrylate.

4. The acrylic composite filament as claimed in claim 1, wherein said one acrylic polymer component is produced by a solution polymerization process.

5. The acrylic composite filament as claimed in claim 1, wherein said mixture is copolymerized in the presence of a catalyst selected from the group consisting of ammonium persulfate, potassium persulfate and t-butyl peroxypivalate.

* * * * *